United States Patent
Van Damme et al.

(10) Patent No.: US 6,596,464 B2
(45) Date of Patent: Jul. 22, 2003

(54) LITHOGRAPHIC PRINTING METHOD USING SINGLE-FLUID INK

(75) Inventors: Marc Van Damme, Bonheiden (BE); Joan Vermeersch, Deinze (BE)

(73) Assignee: Agfa-Gevaert (BE)

(*) Notice: Subject to any disclaimer, the term of this patent is extended or adjusted under 35 U.S.C. 154(b) by 0 days.

(21) Appl. No.: 10/096,208

(22) Filed: Mar. 12, 2002

(65) Prior Publication Data

US 2002/0136988 A1 Sep. 26, 2002

Related U.S. Application Data

(60) Provisional application No. 60/291,518, filed on May 16, 2001.

(30) Foreign Application Priority Data

Mar. 22, 2001 (EP) ............................................ 01000066

(51) Int. Cl.$^7$ ................................................. G03F 7/26
(52) U.S. Cl. ..................... 430/302; 430/19; 430/138; 430/270.1; 430/348; 430/401; 430/494; 430/944; 101/450.1; 101/465; 101/466; 101/467; 101/478
(58) Field of Search ....................... 430/19, 138, 270.1, 430/281.1, 286.1, 288.1, 300, 302, 303, 348, 401, 494, 944, 945, 964; 101/450.1, 453, 456, 463.1, 465, 466, 467, 478; 523/160, 161

(56) References Cited

U.S. PATENT DOCUMENTS

| 5,778,789 A | * | 7/1998 | Krishnan et al. ......... 101/450.1 |
| 6,140,392 A | * | 10/2000 | Kingman et al. ............ 523/160 |
| 6,482,571 B1 | * | 11/2002 | Teng .......................... 430/302 |
| 2002/0072013 A1 | * | 6/2002 | Vander Aa .................. 430/302 |
| 2002/0112630 A1 | * | 8/2002 | Verschueren et al. .... 101/450.1 |

FOREIGN PATENT DOCUMENTS

| EP | 0 242 864 A2 | 10/1987 | |
| EP | 0 924 065 A1 | 6/1999 | |
| EP | 0 924 102 A1 | * 6/1999 | ............ B41N/3/08 |
| WO | WO 00/32705 A1 | 6/2000 | |

OTHER PUBLICATIONS

Search Report for EP 01 00 0066 dated Jul. 27, 2001.

* cited by examiner

Primary Examiner—Janet Baxter
Assistant Examiner—Barbara Gilliam
(74) Attorney, Agent, or Firm—Leydig, Voit & Mayer, Ltd.

(57) ABSTRACT

A lithographic printing method is disclosed which comprising the steps of

- providing an imaging material which comprises a support and an image-recording layer that is not removable with a single-fluid ink which comprises an ink phase and a polar phase;
- image-wise exposure of the image-recording layer to heat or light without substantially ablating said image-recording layer, thereby switching the affinity of the image-recording towards ink or an ink-abhesive fluid and thereby creating a printing master comprising a lithographic image which consists of unexposed areas that have affinity for one phase of said ink phase and polar phase and of exposed areas that have affinity for the other phase of said ink phase and polar phase;
- printing, wherein the single-fluid ink is supplied to the printing master.

The exposed image-recording layer, which normally exhibits a poor differentiation of hydrophilicity or oleophilicity between exposed and non-exposed areas, provides high quality printed copies in combination with the single-fluid ink.

10 Claims, No Drawings

LITHOGRAPHIC PRINTING METHOD USING SINGLE-FLUID INK

This application claims the benefit of U.S. Provisional Application No. 60/291,518, filed May 16, 2001, which is incorporated by reference.

FIELD OF THE INVENTION

The present invention relates to lithographic printing methods wherein an imaging material comprising a switchable image-recording layer is image-wise exposed and wherein single-fluid ink is then supplied to the exposed image-recording layer.

BACKGROUND OF THE INVENTION

Lithographic printing presses use a so-called printing master such as a printing plate which is mounted on a cylinder of the printing press. The master carries a lithographic image on its surface and a print is obtained by applying ink to said image and then transferring the ink from the master onto a receiver material, which is typically paper. In conventional (so-called 'wet') lithographic printing, ink as well as an aqueous fountain solution (also called dampening liquid) are supplied to the lithographic image which consists of oleophilic (or hydrophobic, i.e. ink-accepting, water-repelling) areas as well as hydrophilic (or oleophobic, i.e. water-accepting, ink-repelling) areas. In so-called driographic printing, the lithographic image consists of ink-accepting and ink-abhesive (ink-repelling) areas and during driographic printing, only ink is supplied to the master.

Printing masters are generally obtained by the so-called computer-to-film method wherein various pre-press steps such as typeface selection, scanning, color separation, screening, trapping, layout and imposition are accomplished digitally and each color selection is transferred to graphic arts film using an image-setter. After processing the film can be used as a mask for the exposure of an imaging material called plate precursor and after plate processing, a printing plate is obtained which can be used as a master.

In recent years the so-called computer-to-plate method has gained a lot of interest. This method, also called direct-to-plate method, bypasses the creation of film because the digital document is transferred directly to a plate precursor by means of a so-called plate-setter. A special type of a computer-to-plate process involves the exposure of a plate precursor while being mounted on a plate cylinder of a printing press by means of an image-setter that is integrated in the press. This method is often called 'computer-to-press' and printing presses with an integrated plate-setter are sometimes called digital presses. A review of digital presses is given in the Proceedings of the Imaging Science & Technology's 1997 International Conference on Digital Printing Technologies (Non-Impact Printing 13). Computer-to-press methods have been described in e.g. EP-A 770 495, EP-A 770 496, WO 94001280, EP-A 580 394 and EP-A 774 364. In most computer-to-press methods so-called thermal or heat-mode materials are used, i.e. plate precursors or on-press coatable compositions which comprise a compound that converts absorbed light into heat. The heat which is generated on image-wise exposure triggers a (physico-) chemical process, such as ablation, polymerization, insolubilization by cross-linking of a polymer, decomposition, or particle coagulation of a thermoplastic polymer latex, and after optional processing, a lithographic image is obtained.

Typical plate materials used in computer-to-plate methods are based on ablation. A problem associated with ablative plates is the generation of debris which is difficult to remove and may disturb the printing process or may contaminate the exposure optics of the integrated image-setter. Other methods require wet processing with chemicals which may damage or contaminate the electronics and optics of the integrated image-setter and other devices of the press. Therefore computer-to-press methods normally require the use of plate materials which are not ablative and do not need wet processing. Known examples of such non-ablative processless plate materials contain a so-called 'switchable' image-recording layer, i.e. a layer of which the affinity towards ink or an ink-abhesive fluid can be converted upon image-wise exposure from one state to the opposite state, e.g. from hydrophilic to oleophilic or from ink-accepting to ink-abhesive. Such materials are based on

- switchable polymers (e.g. EP 924 102) which can be image-wise converted from a hydrophobic state to a hydrophilic state (WO92/09934; EP 652 483) or vice-versa (U.S. Pat. No. 4,081,572; EP 200 488; EP 924 065).
- thermally induced coalescence of thermoplastic polymer particles in a crosslinked binder (U.S. Pat. No. 3,476, 937; EP-A 882 583; Research Disclosure no. 33303).
- thermally induced rupture of microcapsules and the subsequent reaction of the microencapsulated oleophilic compounds with functional groups on cross-linked hydrophilic binders (U.S. Pat. No. 5,569,573; EP 646 476; EP 949 088).

A major problem associated with the above non-ablative processless plates is the poor differentiation of the lithographic image, i.e. the small difference in hydrophilicity/oleophilicity of exposed and non-exposed areas resulting in a poor quality of the prints, which is the main reason why such materials have not found any practicle application so far. The poor differentiation is due to the fact that both image and non-image areas are defined by the same layer of which the image-wise conversion from one state to another is not as significant as in other plate materials wherein parts of an exposed layer are removed by wet processing or ablation, thereby revealing an underlying layer, e.g. the support, with an affinity towards ink or an ink-abhesive fluid that is highly different from the image-recording layer.

SUMMARY OF THE INVENTION

It is an object of the present invention to provide a printing method wherein a non-ablative processless imaging material is used for making a lithographic printing plate that provides high quality prints. This object is realized by the method of claim 1 and the preferred embodiments defined in the dependent claims. In the methods of the present invention, the known switchable materials are combined with so-called single-fluid ink. Printing with single-fluid ink is an alternative for the conventional offset methods wherein ink and an aqueous fountain solution is supplied to the plate. Single-fluid ink, which comprises an ink phase and a polar phase in a single liquid, enables printing in conventional 'wet' offset presses without supplying an aqueous fountain solution to the plate. It has surprisingly been found that the poor differentiation of the lithographic image of switchable plate materials provides high quality prints when single-fluid ink is used instead of the conventional ink/fountain.

Further advantages and embodiments of the present invention will become apparent from the following description.

DETAILED DESCRIPTION OF THE INVENTION

The imaging material used in the methods of the present invention comprise a switchable image-recording layer, i.e.

a layer of which the affinity towards ink or an ink-abhesive fluid, such as an aqueous fountain solution, can be converted from one state to another by exposure to heat or light. The image-recording layer is not removable with the single-fluid ink that is supplied during the printing step, e.g. is not soluble in the single-fluid ink or does not form an emulsion therein.

Immediately after image-wise exposure, the image-recording layer comprises a lithographic image consisting of hydrophilic and oleophilic areas ('wet' offset plate) or of ink-accepting and ink-abhesive areas (driographic plate). In a negative-working embodiment the image (printing) areas, i.e. the oleophilic or ink-accepting areas, correspond to the exposed areas. In a positive-working embodiment the non-image (non-printing) areas, i.e. the hydrophilic or ink-abhesive areas, correspond to the exposed areas. In the preferred 'wet' offset embodiment, the image-recording layer can be hydrophilic before exposure and switched to an oleophilic state upon exposure. Alternatively, the image-recording layer can be oleophilic before exposure and switched to an hydrophilic state upon exposure. In preferred positive-working embodiments of 'wet' offset plates used in the present invention, the non-exposed areas accept the ink phase of the single-fluid ink and the exposed areas accept the polar phase of the single-fluid ink. In preferred negative-working embodiments of 'wet' offset plates used in the present invention, the exposed areas accept the ink phase of the single-fluid ink and the non-exposed areas accept the polar phase of the single-fluid ink.

Before turning to preferred compositions of such a 'switchable' image-recording material, some general features which are common to all embodiments shall first be discussed.

The materials can be sensitive to light or to heat. In a preferred light-sensitive embodiment, UV light triggers a photochemical reaction in the image-recording layer which thereby switches from one state of affinity towards ink or an ink-abhesive fluid to the opposite state. The materials are preferably heat-sensitive, so the image-wise exposure can be direct exposure to heat, e.g. by means of a thermal head. More preferably, the heat-mode exposure is carried out by light absorption of one or more compounds in the image-recording layer that are capable of converting light, more preferably infrared light, into heat. Particularly useful light-to-heat converting compounds are for example dyes, pigments, carbon black, metal carbides, borides, nitrides, carbonitrides, bronze-structured oxides, and conductive polymer dispersions such as polypyrrole, polyaniline or polythiophene-based conductive polymer dispersions. Infrared dyes and carbon black are highly preferred.

Alternatively, the light-to-heat converting compound may be present in a separate layer adjacent to the image-recording layer. So light absorption may occur in the image-recording layer itself and/or in a separate light-to-heat converting layer. Between the support and the light-absorbing layer(s), there may be additional layers such as a so-called primer or subbing layer which improves that adhesion of the other layers to the support, or an antihalation layer containing dyes or pigments which absorb any light that has passed the light-absorbing layer(s). Also one or more layer(s), which provide protection against handling or mechanical damage, may be provided on top of the image-recording layer. Such protective top layer(s) should be soluble in the single-fluid ink that is supplied during the printing step. A suitable protective top layer comprises polyvinylalcohol.

The material is preferably not sensitive to daylight. Daylight is understood as the wavelength range from about 300 nm to about 750 nm. "Not sensitive" shall be understood as "not substantially sensitive", i.e. the material can be handled in daylight without darkroom conditions because the daylight exposure does not induce a sufficient conversion of the image-recording layer to obtain a differentiation between exposed and non-exposed areas that would lead to a visible result on the printed copies. More particularly, the preferred material does not comprise photosensitive ingredients such as diazo compounds, photoacids, photoinitiators, or quinone diazides.

The Support

Since the image-recording layer remains on the support after exposure and during the printing step in the exposed as well as the non-exposed areas, the support used in the methods of the present invention may have any affinity for ink and/or an ink-abhesive fluid. In a preferred embodiment the support may have a highly hydrophilic or hydrophobic character, to reinforce the differentiation between exposed and non-exposed areas.

The support may be a sheet-like material such as a plate or it may be a cylindrical element such as a sleeve which can be slid on the print cylinder of a printing press instead of being mounted thereon such as in a conventional printing plate. Preferred supports are plastic sheets or metal plates such as aluminum.

A particularly preferred support is an electrochemically grained and anodized aluminum support. The anodized aluminum support may be treated to improve the hydrophilic properties of its surface. For example, the aluminum support may be silicated by treating its surface with a sodium silicate solution at elevated temperature, e.g. 95° C. Alternatively, a phosphate treatment may be applied which involves treating the aluminum oxide surface with a phosphate solution that may further contain an inorganic fluoride. Further, the aluminum oxide surface may be rinsed with a citric acid or citrate solution. This treatment may be carried out at room temperature or may be carried out at a slightly elevated temperature of about 30 to 50° C. A further interesting treatment involves rinsing the aluminum oxide surface with a bicarbonate solution. Still further, the aluminum oxide surface may be treated with polyvinylphosphonic acid, polyvinylmethylphosphonic acid, phosphoric acid esters of polyvinyl alcohol, polyvinylsulfonic acid, polyvinylbenzenesulfonic acid, sulfuric acid esters of polyvinyl alcohol, and acetals of polyvinyl alcohols formed by reaction with a sulfonated aliphatic aldehyde It is further evident that one or more of these post treatments may be carried out alone or in combination. More detailed descriptions of these treatments are given in GB-A-1 084 070, DE-A-4 423 140, DE-A-4 417 907, EP-A-659 909, EP-A-537 633, DE-A-4 001 466, EP-A-292 801, EP-A-291 760 and U.S. Pat. No. 4,458,005.

According to another embodiment, the support can also be a flexible support, which is preferably provided with a primer layer. The flexible support is e.g. paper, plastic film, thin aluminum, or a laminate thereof. Preferred examples of plastic film are polyethylene terephthalate film, polyethylene naphthalate film, cellulose acetate film, polystyrene film, polycarbonate film, etc. The plastic film support may be opaque or transparent. Particularly suitable primer layers for use in accordance with the present invention comprise a hydrophilic binder and colloidal silica as disclosed in EP-A-619 524, EP-A-620 502 and EP-A-619 525. Preferably, the amount of silica in the adhesion improving layer is between 200 mg/m$^2$ and 750 mg/m$^2$. Further, the ratio of silica to hydrophilic binder is preferably more than 1 and the surface area of the colloidal silica is preferably at least 300 m$^2$/gram, more preferably at least 500 m$^2$/gram.

The support may be provided with a so-called base layer in order to increase the hydrophilic character of the support. A preferred base layer is obtained from a hydrophilic binder cross-linked with a hardening agent such as formaldehyde, glyoxal, polyisocyanate or a hydrolyzed tetra-alkylorthosilicate. The latter is particularly preferred. The thickness of the hydrophilic base layer may vary in the range of 0.2 to 25 μm and is preferably 1 to 10 μm. The hydrophilic binder for use in the base layer is e.g. a hydrophilic (copolymer such as homopolymers and copolymers of vinyl alcohol, acrylamide, methylol acrylamide, methylol methacrylamide, acrylate acid, methacrylate acid, hydroxyethyl acrylate, hydroxyethyl methacrylate or maleic anhydride/vinylmethylether copolymers. The hydrophilicity of the (co)polymer or (co)polymer mixture used is preferably the same as or higher than the hydrophilicity of polyvinyl acetate hydrolyzed to at least an extent of 60% by weight, preferably 80% by weight. The amount of hardening agent, in particular tetraalkyl orthosilicate, is preferably at least 0.2 parts per part by weight of hydrophilic binder, more preferably between 0.5 and 5 parts by weight, most preferably between 1 parts and 3 parts by weight.

The hydrophilic base layer may also contain substances that increase the mechanical strength and the porosity of the layer. For this purpose colloidal silica may be used. The colloidal silica employed may be in the form of any commercially available water dispersion of colloidal silica for example having an average particle size up to 40 nm, e.g. 20 nm. In addition inert particles of larger size than the colloidal silica may be added e.g. silica prepared according to Stöber as described in J. Colloid and Interface Sci., Vol. 26, 1968, pages 62 to 69 or alumina particles or particles having an average diameter of at least 100 nm which are particles of titanium dioxide or other heavy metal oxides. By incorporating these particles the surface of the hydrophilic base layer is given a uniform rough texture consisting of microscopic hills and valleys, which serve as storage places for water in background areas. Particular examples of suitable hydrophilic base layers for use in accordance with the present invention are disclosed in EP-A-601 240, GB-P-1 419 512, FR-P-2 300 354, U.S. Pat. No. 3,971,660, and U.S. Pat. No. 4,284,705.

The Switchable Image-Recording Layer

Any switchable image-recording material for making lithographic printing plates benefits from the solution provided by the present invention. It shall therefore be understood that the compositions described hereafter are preferred classes without limiting the invention thereto. The "switch" can be due to a physical mechanism, e.g. heat-induced polymer particle coagulation, a chemical mechanism, e.g. heat- or light-induced bond-breaking leading to elimination of a functional group, or a physico-chemical mechanism, e.g. heat-induced disrupture of a microcapsule and release of a reactive chemical from said microcapsule. It is clear from the above that the term "heat-induced" also comprises the process wherein the heat is indirectly generated by absorption of incident light, in particular the absorption of infrared light by a light-to-heat converting compound.

According to a first class of preferred embodiments, the image-recording layer comprises a so-called switchable binder. In one embodiment the switchable binder is a polymer which undergoes a polarity transfer from hydrophobic to hydrophilic upon exposure to heat or light. Said polymer has preferably pendant hydrophobic groups which are converted under the action of heat to hydrophilic groups. More preferably said pendant groups are selected from the group comprising t-alkyl carboxylates, t-alkyl carbonates, benzyl-carboxylates and alkoxyalkyl esters.

In a more preferred embodiment the switchable binder undergoes a polarity transfer from hydrophilic to hydrophobic. Preferably the switchable binders according to the latter embodiment are polymers or copolymers which contain pendant polar functions. These polar functions may be carboxylic acids, sulphonic acids, phosphonic acids and phenols or their salts. As counter ion can be used sodium, potassium, ammonium, or tetraalkylammonium ion. Also traces of alkali can be used such as traces of triethylamine and pyridine. These hydrophilic functions readily react under the influence of heat with other functional groups forming a hydrophobic structure.

A more preferred switchable binder according to the preferred embodiment is a binder containing maleic acid, which binder is hydrophilic and which yields under the influence of heat a binder containing maleic anhydride which binder is hydrophobic. Also more preferred switchable binders according to the invention are binders containing fumaric acid, itaconic acid, 3- or 4-vinylphthalic acid, cis-1,2,3,6-tetrahydrophthalic acid or cis-5-norbene-endo-2, 3-dicarboxylic acid. Said acids can be mixed in one copolymer. Not only the diacids but also the monoalkyl esters and their salts are more preferred. Examples of such half-esters are monobutyl maleate copolymers, mono-isopropyl maleate copolymers, maleic acid 2-butoxy ethyl ester copolymer, maleic acid isobutylester copolymers and maleic acid isooctyl ester copolymers. These halfesters can also be used in combination with the corresponding dicarboxylic substance in one copolymer or they can be mixed with each other or with another dicarboxylic acid or salt into one copolymer.

Not only copolymers obtained by copolymerization of e.g. maleic acid but also polymers derivatives obtained by grafting e.g. maleic acid on unsaturated polyolefines are very suitable switchable polymers. Preferably a switchable binder according to the latter embodiment is a copolymer preferably containing an acrylate, a methacrylate, a vinyl halide, a vinyl ester, a vinyl ether such as n-butyl-, isobutyl-, and 2-chloroethyl vinyl ether and olefines such as propylene, isobutylene and 1-octadecene. More preferably is a compound selected from the group consisting of methyl vinylether copolymer, ethene copolymer and styrene copolymer. Most preferably said binder is a copolymer containing maleic acid and vinyl methyl ether.

The weight ratio of the dicarboxylic monomer to comonomer can be 100:0 to 20:80, or sufficient for its structure or state (i.e. anhydride or otherwise) to affect the overall solubility of the top layer. Typically the ratio is near 50:50 due to a tendency toward alternating copolymerization. The molecular weight is generally between 5,000 up to 70,000 weight average molecular weight, preferably between 10,000 and 40,000 g/mol.

The image forming layer may comprise more than one switchable polymer although that is not preferred. The image forming layer may also comprise a further binder to enhance the hydrophilic or hydrophobic properties of said layer. As hydrophilic binder there may be used hydrophilic (co)polymers such as for example, homopolymers and copolymers of acrylamide, methylol acrylamide, methylol methacrylamide, acrylic acid, methacrylic acid, hydroxyethyl acrylate, hydroxyethyl methacrylate or maleic anhydride/vinylmethylether copolymers. The hydrophilicity of the (co)polymer or (co)polymer mixture used is preferably the same as or higher than the hydrophilicity of polyvinyl acetate hydrolyzed to at least an extent of 60 percent by weight, preferably 80 percent by weight. A preferred hydrophilic binder is polyvinylalcohol.

As hydrophobic binder there may be used a water insoluble polymer such as a cellulose ester, a copolymer of vinylidene chloride and acrylonitrile, poly(meth)acrylates and polyvinylchloride. Preferred hydrophobic binders are hydrophobic binders as used in conventional positive or negative working PS-plates e.g. novolac, polyvinyl phenols, carboxy substituted polymers etc. Typical examples of these polymers are described in DE-A-4 007 428, DE-A-4 027 301 and DE-A-4 445 820.

Specific examples of switchable image-recording layers that are suitable for use in the present embodiment can be found in EP 924 102; WO92/09934; EP 652 483; U.S. Pat. No. 4,081,572; EP 200 488; and EP 924 065.

According to a second class of preferred embodiments, the image-recording layer comprises hydrophobic thermoplastic polymer particles in a cross-linked hydrophilic binder. Preferably, the hydrophilic binder is a homopolymer or copolymer of vinyl alcohol, acrylamide, methylol acrylamide, methylol methacrylamide, acrylic acid, methacrylic acid, hydroxyethyl acrylate, hydroxyethyl methacrylate or maleic anhydride/vinylmethylether copolymers. The hydrophilicity of the (co)polymer or (co)polymer mixture used is the same as or higher than the hydrophilicity of polyvinyl acetate hydrolyzed to at least an extent of 60 percent by weight, preferably 80 percent by weight. Polyvinyl alcohol is highly preferred.

The crosslinking agent is preferably a tetraalkyl orthosilicate crosslinking agents such as hydrolyzed tetraethyl orthosilicate and hydrolyzed tetramethyl orthosilicate. The amount of tetraalkyl orthosilicate crosslinking agent is at least 0.2 parts by weight per part by weight of hydrophilic (co)polymer, preferably between 0.5 and 5 parts by weight, preferably 1.5 part by weight.

The hydrophilic layer of the heat recording material preferably also contains substances that increase the mechanical strength and the porosity of the layer. For this purpose colloidal silica may be used. The colloidal silica employed may be in the form of any commercially available water-dispersion of colloidal silica for example having an average particle size up to 40 nm, e.g. 20 nm. In addition inert particles of larger size than the colloidal silica can be added e.g. silica prepared according to Stöber as described in J. Colloid and Interface Sci., Vol. 26, 1968, pages 62 to 69 or alumina particles or particles having an average diameter of at least 100 nm which are particles of titanium dioxide or other heavy metal oxides. By incorporating these particles the surface of the layer is given a uniform rough texture consisting of microscopic hills and valleys, which serve as storage places for water in background areas. More details about suitable hydrophilic layers for use in connection with the present embodiment can be found in e.g. GB-P-1419512, FR-P-2300354, U.S. Pat. Nos. 3,971,660, 4,284,705, EP-A-405016 and EP-A-450199.

The hydrophobic thermoplastic polymer particles preferably have a softening or melting temperature above 30° C. and more preferably above 40° C. There is no specific upper limit to the softening or melting temperature of the thermoplastic hydrophobic polymer particles, however the temperature should be sufficiently below the decomposition of the polymer particles. Preferably the softening or melting temperature is at least 10° C. below the temperature at which the decomposition of the polymer particles occurs. When said polymer particles are subjected to a temperature above their softening or melting point they should coagulate to form a hydrophobic agglomerate in the hydrophilic layer so that at these parts the hydrophilic layer becomes sufficiently hydrophobic to accept a greasy ink in lithographic printing wherein a dampening liquid is used.

Specific examples of hydrophobic polymer particles for use in connection with the present embodiment are e.g. polyethylene, polyvinyl chloride, polymethyl (meth) acrylate, polyethyl (meth)acrylate, polyvinylidene chloride, polyacrylonitrile, polyvinyl carbazole etc. or copolymers thereof. Most preferably used is polystyrene. The molecular weight of the polymers may range from 5,000 to 1,000,000. The hydrophobic particles may have a particle size from 0.01 $\mu$m to 50 $\mu$m, more preferably between 0.05 $\mu$m and 10 $\mu$m and most preferably between 0.05 $\mu$m and 2 $\mu$m. The larger the polymer particles are the less the resolving power of the heat recording material will be. The polymer particles may be prepared by the methods disclosed in U.S. Pat. No. 3,476,937. The amount of hydrophobic thermoplastic polymer particles contained in the hydrophilic layer is preferably between 20% by weight and 65% by weight and more preferably between 25% by weight and 55% by weight and most preferably between 30% by weight and 45% by weight.

According to a third class of preferred embodiments, the image-recording layer comprises microcapsules which can be ruptured upon heating and then preferably releases an oleophilic material which reacts with a cross-linked hydrophilic binder. Suitable specific examples can be found in U.S. Pat. No. 5,569,573; EP 646 476 and EP 949 088.

The Single-Fluid Ink

Single-fluid inks which are suitable for use in the method of the present invention have been described in U.S. Pat. Nos. 4,045,232 and 4,981,517. In a most preferred embodiment, the single fluid ink comprises an ink phase, also called the hydrophobic or oleophilic phase, and a polyol phase as described in WO 00/32705, of which the relevant content is reproduced hereinafter.

The hydrophobic phase preferably comprises a vinyl resin having carboxyl functionality. The term "vinyl resin" includes polymers prepared by chain reaction polymerization, or addition polymerization, through carbon—carbon double bonds, using vinyl monomers and monomers copolymerizable with vinyl monomers. Typical vinyl monomers include, without limitation, vinyl esters, acrylic and methacrylic monomers, and vinyl aromatic monomers including styrene. The vinyl polymers may be branched by including in the polymerization reaction monomers that have two reaction sites. When the vinyl polymer is branched, it nonetheless remains usefully soluble. By "soluble" it is meant that the polymer can be diluted with one or more solvents. (By contrast, polymers may be crosslinked into insoluble, three-dimensional network structures that are only be swelled by solvents.) The branched vinyl resins retain solvent dilutability in spite of significant branching.

The carboxyl-functional vinyl polymers may be prepared by polymerization of a monomer mixture that includes at least one acid-functional monomer or at least one monomer that has a group that is converted to an acid group following polymerization, such as an anhydride group. Examples of acid-functional or anhydride-functional monomers include, without limitation, $\alpha,\beta$-ethylenically unsaturated monocarboxylic acids containing 3 to 5 carbon atoms such as acrylic, methacrylic, and crotonic acids; $\alpha,\beta$-ethylenically unsaturated dicarboxylic acids containing 4 to 6 carbon atoms and the anhydrides and monoesters those acids, such as maleic anhydride, and fumaric acid; and acid-functional derivatives of copolymerizable monomers, such as the hydroxylethyl acrylate half-ester of succinic acid.

It is preferred to include an acid-functional monomer such as acrylic acid, methacrylic acid, or crotonic acid, or an anhydride monomer such as maleic anhydride or itaconic anhydride that may be hydrated after polymerization to generate acid groups. It is preferred for the acid-functional vinyl polymer to have an acid number of at least about 3 mg KOH per gram nonvolatile, preferably an acid number of from about 6 to about 30 mg KOH per gram nonvolatile, and more preferably an acid number of from about 8 to about 25 mg KOH per gram nonvolatile, based upon the nonvolatile weight of the vinyl polymer.

In a preferred embodiment, the acid-functional polymers are significantly branched. The inks used in the present invention preferably include a vinyl polymer that is branched but usefully soluble. The branched vinyl polymers may be diluted, rather than swollen, by addition of solvent. The branching may be accomplished by at least two methods. In a first method, a monomer with two or more polymerizable double bonds is included in the polymerization reaction. In a second method, a pair of ethylenically unsaturated monomers, each of which has in addition to the polymerizable double bond at least one additional functionality reactive with the additional functionality on the other monomer, are included in the monomer mixture being polymerized. Preferably, the reaction of the additional functional groups takes place during the polymerization reaction, although this is not seen as critical and the reaction of the additional functional groups may be carried out partially or wholly before or after polymerization. A variety of such pairs of mutually reactive groups are possible. Illustrative examples of such pairs of reactive groups include, without limitation, epoxide and carboxyl groups, amine and carboxyl groups, epoxide and amine groups, epoxide and anhydride groups, amine and anhydride groups, hydroxyl and carboxyl or anhydride groups, amine and acid chloride groups, alkylene-imine and carboxyl groups, organoalkoxysilane and carboxyl groups, isocyanate and hydroxyl groups, cyclic carbonate and amine groups, isocyanate and amine groups, and so on. When carboxyl or anhydride groups are included as one of the reactive groups, they are used in a sufficient excess to provide the required carboxyl functionality in the vinyl resin. Specific examples of such monomers include, without limitation, glycidyl (meth)acrylate with (meth) acrylic acid, N-alkoxymethylated acrylamides (which react with themselves) such as N-isobutoxymethylated acrylamide, gamma-methacryloxytrialkoxysilane (which reacts with itself), and combinations thereof.

Preferably, the vinyl resin is polymerized using at least one monomer having two or more polymerizable ethylenically unsaturated bonds, and particularly preferably from two to about four polymerizable ethylenically unsaturated bonds. Illustrative examples of monomers having two or more ethylenically unsaturated moieties include, without limitation, (meth)acrylate esters of polyols such as 1,4-butanediol di(meth)acrylate, 1,6-hexanediol di(meth) acrylate, neopentyl glycol di(meth)acrylate, trimethylol propane tri(meth)acrylate, tetramethylol methane tetra(meth) acrylate, pentaerythritol tetra(meth)acrylate, dipentaerythritol penta(meth)acrylate, dipentaerythritol hexa(meth)acrylate, alkylene glycol di(meth)acrylates and polyalkylene glycol di(meth)acrylates, such as ethylene glycol di(meth)acrylate, butylene glycol di(meth)acrylate, diethylene glycol di(meth)acrylate, triethylene glycol di(meth)acrylate, and polyethylene glycol di(meth)acrylate; divinylbenzene, allyl methacrylate, diallyl phthalate, diallyl terephthalate, and the like, singly or in combinations of two or more. Of these, divinylbenzene, butylene glycol dimethacrylate, butanediol dimethacrylate, trimethylolpropane triacrylate, and pentaerythritol tetra-acrylate are highly preferred, and divinylbenzene is still more highly preferred.

Preferably, the branched vinyl polymer is polymerized using at least about 0.008 equivalents per 100 grams of monomer polymerized of at least one monomer having at least two ethylenically unsaturated polymerizable bonds, or 0.004 equivalents per 100 grams of monomer polymerized of each of two monomers having mutually reactive groups in addition to an ethylenically unsaturated polymerizable bond. Preferably, the branched vinyl polymer is polymerized using from about 0.012 to about 0.08 equivalents, and more preferably from about 0.016 to about 0.064 equivalents per 100 grams of monomer polymerized of the polyfunctional monomer or monomers having at least two ethylenically unsaturated polymerizable bonds or of the pair of monomers having one polymerization bond and one additional mutually reactive group.

The polyfunctional monomer or monomers preferably have from two to four ethylenically unsaturated polymerizable bonds, and more preferably two ethylenically unsaturated polymerizable bonds. In one embodiment it is preferred for the branched vinyl resin to be prepared by polymerizing a mixture of monomers that includes from about 0.5% to about 6%, more preferably from about 1.2% to about 6%, yet more preferably from about 1.2% to about 4%, and even more preferably from about 1.5% to about 3.25% divinylbenzene based on the total weight of the monomers polymerized. (Commercial grades of divinylbenzene include mono-functional and/or non-functional material. The amount of the commercial material needed to provide the indicated percentages must be calculated. For example, 5% by weight of a material that is 80% by weight divinylbenzene/20% mono-functional monomers would provide 4% by weight of the divinylbenzene fraction.)

The optimum amount of (1) divinylbenzene or other monomer having at least two polymerizable ethylenically unsaturated bond or (2) pair of monomers having polymerizable group and additional, mutually-reactive groups that are included in the polymerization mixture depends to some extent upon the particular reaction conditions, such as the rate of addition of monomers during polymerization, the solvency of the polymer being formed in the reaction medium chosen, the amount of monomers relative to the reaction medium, the half-life of the initiator chosen at the reaction temperature and the amount of initiator by weight of the monomers, and may be determined by straightforward testing.

Other monomers that may be polymerized along with the polyfunctional monomers and the acid-functional monomers (or monomers with groups that can later be converted to acid groups) include, without limitation, esters of α,β-ethylenically unsaturated monocarboxylic acids containing 3 to 5 carbon atoms such as esters of acrylic, methacrylic, and crotonic acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The selection of monomers is made on the basis of various factors commonly considered in making ink varnishes, including the desired glass transition temperature and the desired dilutability of the resulting polymer in the solvent or solvent system of the ink composition.

The preferred vinyl polymers may be prepared by using conventional techniques, preferably free radical polymerization in a semi-batch process. For instance, the monomers, initiator(s), and any chain transfer agent may be fed at a controlled rate into a suitable heated reactor charged with solvent in a semi-batch process. Typical free radical sources are organic peroxides, including dialkyl peroxides, such as di-tert-butyl peroxide and dicumyl peroxide, peroxyesters, such as tert-butyl peroxy 2-ethylhexanoate and tert-butyl peroxy pivalate; peroxy carbonates and peroxydicarbonates, such as tert-butyl peroxy isopropyl carbonate, di-2-ethylhexyl peroxydicarbonate and dicyclohexyl peroxydicarbonate; diacyl peroxides, such as dibenzoyl peroxide and dilauroyl peroxide; hydroperoxides, such as cumene hydroperoxide and tert-butyl hydroperoxide; ketone peroxides, such as cyclohexanone peroxide and methylisobutyl ketone peroxide; and peroxyketals, such as 1,1-bis(tert-butyl peroxy)-3,5,5-trimethylcyclohexane and 1,1-bis(tert-butyl peroxy)cyclohexane; as well as azo compounds such as 2,2'-azobis(2-methylbutanenitrile), 2,2'-azobis(2-methyl) propionitrile, and 1,1'-azobis(cyclohexanecarbonitrile). Organic peroxides are preferred. Particularly preferred is tert-butyl peroxy isopropyl carbonate. Chain transfer agents may also be used in the polymerization. Typical chain transfer agents are mercaptans such as octyl mercaptan, n- or tert-dodecyl mercaptan, thiosalicylic acid, mercaptocarboxylic acids such as mercaptoacetic acid and mercaptopropionic acid and their esters, and mercaptoethanol; halogenated compounds; and dimeric α-methyl styrene. Preferably, no chain transfer agent is included because of odor and other known drawbacks. The particular initiator and amount of initiator used depends upon factors known to the person skilled in the art, such as the reaction temperature, the amount and type of solvent (in the case of a solution polymerization), the half-life of the initiator, and so on.

The addition polymerization is usually carried out in solution at temperatures from about 20° C. to about 300° C., preferably from about 150° C. to about 200° C., more preferably from about 160° C. to about 165° C. Preferably, the polymerization is carried out with approximately the same reaction temperature and using the same initiator(s) throughout. The initiator should be chosen so its half-life at the reaction temperature is preferably no more than about thirty minutes, particularly preferably no more than about five minutes, and yet more preferably no more than about two minutes. Particularly preferred are initiators having a half-life of less than about one minute at a temperature of from about 150° C. to about 200° C. In general, more of the branching monomer can be included when the initiator half-life is shorter and/or when more initiator is used. The vinyl polymer vehicles used in the ink preferably have little or no residual (unreacted) monomer content. In particular, the vinyl vehicles are preferably substantially free of residual monomer, i.e., have less than about 0.5% residual monomer, and even more preferably less than about 0.1% residual monomer by weight, based on the total weight of the monomers being polymerized.

In a semi-batch process, the monomer and initiator is added to the polymerization reactor over a period of time, preferably at a constant rate. Typically, the add times are from about 1 to about 10 hours, and add times of from about three to about five hours are common. Longer add times typically produce lower number average molecular weights. Lower number average molecular weights may also be produced by increasing the ratio of solvent to monomer or by using a stronger solvent for the resulting polymer.

In general, the branched vinyl polymer used in the ink has a low number average molecular weight and a broad polydispersity. The number average molecular weight and weight average molecular weight of a vinyl resin used in the ink can be determined by gel permeation chromatography using polystyrene standards, which are available for up to 6 million weight average molecular weight, according to well-accepted methods. Polydispersity is defined as the ratio of $M_w/M_n$. In a preferred embodiment, the vinyl polymer has a number average molecular weight ($M_n$) of at least about 1000, and more preferably at least about 2000. The number average molecular weight is also preferably less than about 15,000, more preferably less than about 10,000, and even more preferably less than about 8500. A preferred range for $M_n$ is from about 1000 to about 10,000, a more preferred range for $M_n$ is from about 2000 to about 8500, and an even more preferred range is from about 4000 to about 8000. The weight average molecular weight should be at least about 30,000, preferably at least about 100,000. The weight average molecular weight ($M_w$) is preferably up to about 60 million, based upon a GPC determination using an available standard having 6 million weight average molecular weight. A preferred range for $M_w$ is from about 30,000 to about 55 million, a more preferred range for $M_w$ is from about 100,000 to about 1 million, and a still more preferred range is from about 100,000 to about 300,000. Resins having ultra-high molecular weight shoulders (above about 45 million), which can be seen by GPC, are preferably avoided for the $M_w$ range of from about 100,000 to about 300,000. The polydispersity, or ratio of $M_w/M_n$, may be up to about 10,000, preferably up to about 1000. The polydispersity is preferably at least about 15, particularly preferably at least about 50. The polydispersity preferably falls in the range of from about 15 to about 1000, and more preferably it falls in a range of from about 50 to about 800.

The theoretical glass transition temperature can be adjusted according to methods well-known in the art through selection and apportionment of the commoners. In a preferred embodiment, the theoretical $T_g$ is above room temperature, and preferably the theoretical $T_g$ is at least about 60° C., more preferably at least about 70° C. The methods and compositions of the present invention preferably employ vinyl polymers having a $T_g$ of from about 50° C. to about 125° C., more preferably from about 60° C. to about 100° C., and even more preferably from about 70° C. to about 90° C.

In one embodiment of the single-fluid ink, the acid-functional vinyl polymer, which may be a branched vinyl polymer, is combined with other resins in the ink composition. Examples of suitable other resins that may be combined with the acid-functional vinyl polymer include, without limitation, polyester and alkyd resins, phenolic resins, rosins, cellulosics, and derivatives of these such as rosin-modified phenolics, phenolic-modified rosins, hydrocarbon-modified rosins, maleic modified rosin, fumaric modified rosins; hydrocarbon resins, other acrylic or vinyl resins, polyamide resins, and so on. Such resins or polymers may be include in amounts of up to about 6 parts by weight to about 1 part by weight of the acid-functional vinyl polymer, based upon the nonvolatile weights of the resins.

In addition to the acid-functional vinyl resin and any optional second resin, the ink compositions preferably include one or more solvents. In a preferred embodiment of the single-fluid ink, the branched vinyl resin forms a solution or apparent solution having no apparent turbidity in the solvent or solvents of the ink formulation. The particular solvents and amount of solvent included is determined by the ink viscosity, body, and tack desired. In general, non-oxygenated solvents or solvents with low Kauri-butanol (KB) values are used for inks that will be in contact with rubber parts such as rubber rollers during the lithographic process, to avoid affecting the rubber. Suitable solvents for inks that will contact rubber parts include, without limitation, aliphatic hydrocarbons such as petroleum distillate fractions and normal and iso paraffinic solvents with limited aromatic character. For example, petroleum middle distillate fractions such as those available under the trade name Magie Sol, available from Magie Bros. Oil Company, a subsidiary of Pennsylvania Refining Company, Franklin Park, Ill., under the tradename ExxPrint, available from Exxon Chemical Co., Houston, Tex., and from Golden Bear Oil Specialties, Oildale, Calif., Total Petroleum Inc., Denver, Colo., and Calumet Lubricants Co., Indianapolis, Ind. may be used. In addition or alternatively, soybean oil or other vegetable oils may be included.

When non-oxygenated solvents such as these are used, it is generally necessary to include a sufficient amount of at least one monomer having a substantial affinity for aliphatic solvents in order to obtain the desired solvency of the preferred branched vinyl polymer. In general, acrylic ester monomers having at least six carbons in the alcohol portion of the ester or styrene or alkylated styrene, such as-tert-butyl styrene, may be included in the polymerized monomers for this purpose. In a preferred embodiment, an ink composition with non-oxygenated solvents includes a branched vinyl resin polymerized from a monomer mixture including at least about 20%, preferably from about 20% to about 40%, and more preferably from about 20% to about 25% of a monomer that promotes aliphatic solubility such as stearyl methacrylate or t-butyl styrene, with stearyl methacrylate being a preferred such monomer. It is also preferred to include at least about 55% percent styrene, preferably from about 55% to about 80% styrene, and more preferably from about 60% to about 70% styrene. Methyl methacrylate or other monomers may also be used to reduce solvent tolerance in aliphatic solvent, if desired. All percentages are by weight, based upon the total weight of the monomer mixture polymerized. Among preferred monomer compositions for vinyl polymers for lithographic inks are those including a (meth)acrylic ester of an alcohol having 8–20 carbon atoms such as stearyl methacrylate, styrene, divinylbenzene, and (meth)acrylic acid. In a preferred embodiment, a branched vinyl for a lithographic printing ink is made with from about 15, preferably about 20, to about 30, preferably about 25, weight percent of a (meth)acrylic ester of an alcohol having 8–20 carbon atoms, especially stearyl methacrylate; from about 50, preferably about 60, to about 80, preferably about 75, weight percent of a styrenic monomer, especially styrene itself; an amount of divinylbenzene as indicated above; and from about 0.5, preferably about 2.5, to about 5, preferably about 4, weight percent of acrylic acid or, more preferably, of methacrylic acid.

Preferably, the solvent or solvent mixture will have a boiling point of at least about 100° C. and preferably not more than about 550° C. Offset printing inks may use solvents with boiling point above about 200° C. News inks usually are formulated with from about 20 to about 85 percent by weight of solvents such as mineral oils, vegetable oils, and high boiling petroleum distillates. The amount of solvent also varies according to the type of ink composition (that is, whether the ink is for newsprint, heatset, sheetfed, etc.), the specific solvents used, and other factors known in the art. Typically the solvent content for lithographic inks is up to about 60%, which may include oils as part of the solvent package. Usually, at least about 35% solvent is present in lithographic ink. When used to formulate the preferred single-fluid ink compositions, these varnishes or vehicles, including the branched vinyl resins, are typically clear, apparent solutions.

The ink compositions will usually include one or more pigments. The number and kinds of pigments will depend upon the kind of ink being formulated. News ink compositions typically will include only one or only a few pigments, such as carbon black, while gravure inks may include a more complicated pigment package and may be formulated in many colors, including colors with special effects such as pearlescence or metallic effect. Lithographic printing inks are typically used in four colors—magenta, yellow, black, and cyan, and may be formulated for pearlescence or metallic effect. Any of the customary inorganic and organic pigments may be used in the ink compositions of the present invention. Alternatively, the compositions may be used as overprint lacquers or varnishes. The overprint lacquers (air drying) or varnishes (curing) are intended to be clear or transparent and thus opaque pigments are not included.

Lithographic ink compositions used in the invention are formulated as single-fluid inks having an oil-based continuous phase that contains the acid-functional vinyl vehicle and a polyol discontinuous phase that contains a liquid polyol. The vinyl polymer phase is relatively stable toward the polyol phase. The stability is such that the two phases do not separate in the fountain. During application of the ink, however, the emulsion breaks and the polyol comes to the surface, wetting out the areas of the plate that are not to receive ink. Inks that are stable in the fountain but break quickly to separate on the plate print cleanly without toning and provide consistent transfer characteristics. Proper stability also may depend upon the particular acid-functional vinyl polymer and the particular polyol chosen. The acid number and molecular weight may be adjusted to provide the desired stability.

Higher acid number vinyl resins can be used in lower amounts, but the acid number cannot be excessively high or else the vinyl polymer will not be sufficiently soluble in the hydrocarbon solvent. In general, it is believed that an increase in acid number of the acid-functional vinyl resin should be accompanied by a decrease in the amount of such resin included in the hydrophobic phase.

Polyethylene glycol oligomers such as diethylene glycol, triethylene glycol, and tetraethylene glycol, as well as ethylene glycol, propylene glycol, and dipropylene glycol, are examples of liquid polyols that are preferred for the polyol phase of the single-fluid ink used in the invention. The polyol phase may, of course, include mixtures of different liquid polyols. In general, lower acid number vinyl or acrylic polymers are used with higher molecular weight polyols. The polyol phase may include further materials. A weak acid such as citric acid, tartaric acid, or tannic acid, or a weak base such as triethanolamine, may be included in an amount of from about 0.01 weight percent up to about 2 weight percent of the ink composition. Certain salts such as magnesium nitrate may be included in amounts of from about 0.01 weight percent to about 0.5 weight percent, preferably from about 0.08 to about 1.5 weight percent, based on the weight of the ink composition, to help protect the plate and extend the life of the plate. A wetting agent, such as polyvinylpyrolidone, may be added to aid in wetting of the plate. From about 0.5 weight percent to about 1.5 weight percent of the polyvinylpyrollidone is included, based on the weight of the ink composition.

Single-fluid inks may be formulated with from about 5% to about 50%, preferably from about 10% to about 35%, and particularly preferably from about 20% to about 30% of polyol phase by weight based on the total weight of the ink composition. Unless another means for cooling is provided, there is preferably a sufficient amount of polyol in the ink composition to keep the plate at a workably cool temperature. The amount of polyol phase necessary to achieve good toning and printing results depends upon the kind of plate being used and may be determined by straightforward testing. Up to about 4 or 5% by weight of water may be included in the polyol phase mixture to aid in dissolving or homogenizing the ingredients of the polyol phase.

It will be appreciated by the skilled artisan that other additives known in the art that may be included in the ink compositions used in the invention, so long as such additives do not significantly detract from the benefits of the present invention. Illustrative examples of these include, without limitation, pour point depressants, surfactants, wetting agents, waxes, emulsifying agents and dispersing agents, defoamers, antioxidants, UV absorbers, dryers (e.g., for formulations containing vegetable oils), flow agents and other rheology modifiers, gloss enhancers, and anti-settling agents. When included, additives are typically included in amounts of at least about 0.001% of the ink composition, and may be included in amount of about 7% by weight or more of the ink composition.

The compositions described above are particularly suited for use in lithographic applications, including, without limitation, as heatset inks, news inks, and sheetfed inks. Offset printing processes in which the inks may be used are well-known in the art and are described in many publications.

The Exposure Step

The imaging materials used in the present invention are exposed to heat or to light, e.g. by means of a thermal head, LEDs or a laser head. Preferably, one or more lasers such as a He/Ne laser, an Ar lasers or a violet laser diode are used. Most preferably, the light used for the exposure is not visible light so that daylight-stable materials can be used, e.g. UV (laser) light or a laser emitting near infrared light having a wavelength in the range from about 700 to about 1500 nm is used, e.g. a semiconductor laser diode, a Nd:YAG or a Nd:YLF laser. The required laser power depends on the sensitivity of the image-recording layer, the pixel dwell time of the laser beam, which is determined by the spot diameter (typical value of modern plate-setters at $1/e^2$ of maximum intensity 10–25 $\mu$m), the scan speed and the resolution of the exposure apparatus (i.e. the number of addressable pixels per unit of linear distance, often expressed in dots per inch or dpi; typical value 1000–4000 dpi).

Two types of laser-exposure apparatuses are commonly used: internal (ITD) and external drum (XTD) plate-setters. ITD plate-setters for thermal plates are typically characterized by a very high scan speed up to 500 m/sec and may require a laser power of several Watts. XTD plate-setters for thermal plates having a typical laser power from about 200 mW to about 1 W operate at a lower scan speed, e.g. from 0.1 to 10 m/sec.

The known plate-setters can be used as an off-press exposure apparatus in the present invention. This offers the benefit of reduced press down-time. XTD plate-setter configurations can also be used for the more preferred on-press exposure, offering the benefit of immediate registration in a multi-color press. More technical details of on-press exposure apparatuses are described in e.g. U.S. Pat. Nos. 5,174,205 and 5,163,368.

EXAMPLES

Preparation of a Heatset Single-Fluid Ink
1. Preparation of a Vinyl Varnish

An amount of 44.19 parts by weight of Ketrul 220 (a petroleum middle distillate fraction available from Total Petroleum, Inc.) is charged to a glass reactor equipped with stirrer, nitrogen inlet, total reflux condenser, and monomer inlet. The solvent is heated to 160° C. with stirring under a blanket of nitrogen. A monomer mixture of 36.01 parts by weight styrene, 12.27 parts by weight stearyl methacrylate, 2.62 parts by weight divinylbenzene, 1.89 parts by weight methacrylic acid, and 2.79 parts by weight t-butyl peroxy isopropyl carbonate (75% solution in mineral spirits) is added to the reactor over a period of three hours. After the monomer addition is complete, 0.23 parts by weight of t-butyl peroxy isopropyl carbonate is added over a period of fifteen minutes. The temperature is held at 160° C. for an additional two hours to allow for complete conversion of the monomer to polymer.

The measured amount of non-volatile matter (NVM) is 55%. The percent conversion, measured as NVM divided by the percent of the total weight of monomers, is 100.1. The acid number on solution is 12.0 mg KOH per gram. The viscosity is 30 Stokes (bubble tube, 54.4° C.). The solvent tolerance is 230% and the NVM at cloud point is 16.7%.

2. Preparation of Single-Fluid Ink 58.0 grams of the following Mixture A is added to 142.0 grams of the following Mixture B with stirring. The ink composition is mixed for 20 minutes on a dispersator, maintaining a vortex and holding the temperature under 60° C. The ink composition has a single fall time Laray of 14 to 17 seconds for 500 grams at 30° C.

Mixture A: Mix in a glass beaker until clear 181.0 grams of diethylene glycol, 8.0 grams of water, 0.4 grams of citric acid, and 0.4 grams of magnesium nitrate. Add 191.2 grams of diethylene glycol and mix until homogenous.

Mixture B: Mix, using a high-speed mixer, 46.0 grams of the above Vinyl Varnish, 4.0 grams of Blue Flush 12-FH-320 (available from CDR Corporation, Elizabethtown, Ky.) 1.0 gram technical grade Soy oil (available from Cargill, Chicago, Ill.) and 0.6 grams of an antioxidant. While mixing, add 34.4 grams of a hydrocarbon resin solution (60% LX-2600 in EXX-Print 283D, available from Neville), 27.0 grams of a carbon black (CSX-156 available from Cabot Corp.), and 1.0 gram of a polytetrafluoroethylene wax (Pinnacle 9500D, available from Carrol Scientific). Mix at a high speed for 30 minutes at 149° C. Slow the mixing speed and add 27.0 grams of EXX-Print 588D (available from Exxon). Mill the premix in a shot mill to a suitable grind.

Mixture B has a Laray viscosity of 180 to 240 poise and a Laray yield of 800 to 1200 (according to test method ASTM D4040: Power Law-3 k, 1.5 k, 0.7 k, 0.3 k). Mixture B is tested on the Inkometer for one minute at 1200 rpm for a measured result of 25 to 29 units.

Imaging Material 1

0.35 g of GANTREZ AN 139 BF (a copolymer of vinylmethylether, maleic acid and maleic acid anhydride, commercially available from GAF, USA) and 0.0365 g of IR-absorbing dye IR-1 (formula below) are dissolved in 4.5 g of a solvent mixture consisting for 44% of THF, 34% of methoxypropanol and 22% of methyl ethyl ketone. Said solution was coated onto an aluminum support to a wet coating thickness of 16 μm resulting after drying in a dry layer with a thickness of 1.15 g/m². This imaging element was exposed on a CREO 3244 Trendsetter (tradename of CREO, Canada) at 2400 dpi, operating at a drum speed of 40 rpm and a laser output of 12 watt.

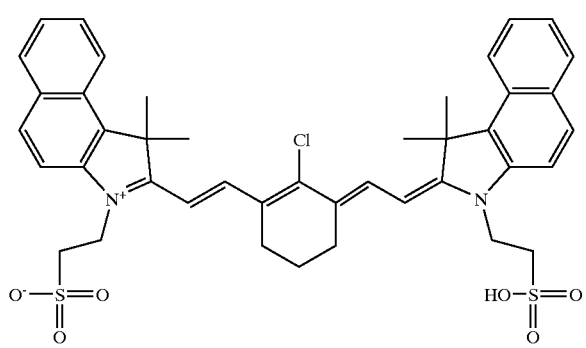

IR-1

Imaging Material 2

An imaging material was prepared by coating at 30° C. on a polyester support (containing a hydrophilic adhesion layer) to a dry coating thickness of 3 μm a layer containing 15.7% of TiO$_2$, 15.7% of polyvinyl alcohol, 31.3% of a polyethylene latex (average particle size 0.15 μm and molecular weight 18000 g/mol), 31.3% of hydrolyzed tetramethylorthosilicate and 6% of carbon black. The obtained material was image-wise exposed using an Argon ion laser (488 nm line, power of 225 mW, spot size of 70 μm, scan speed 0.125 m/s)

Printing Results

Both exposed materials were mounted on the print cylinder of a Heidelberg GTO52 printing press, equipped with a Dahlgren integrated ink supply/dampening system. The press was started and the above described single-fluid ink was supplied to the image-recording layer. No dampening liquid was supplied. Clear prints were obtained with no ink uptake in the non-image parts.

What is claimed is:

1. A lithographic printing method comprising the steps of providing an imaging material which comprises a support and an image-recording layer or an image-recording surface, wherein said layer or surface is not removable with a single-fluid ink comprising an ink phase and a polar phase;

image-wise exposure of the imaging material to heat or light without substantially ablating said image-recording layer or surface, thereby switching the affinity of the image-recording layer or surface towards ink or an ink-abhesive fluid and thereby creating a printing master comprising a lithographic image which consists of unexposed areas that have affinity for one phase of said ink phase and polar phase and of exposed areas that have affinity for the other phase of said ink phase and polar phase;

printing, wherein the single-fluid ink is supplied to the printing master.

2. A method according to claim 1 wherein the image-recording layer or surface is switched by the exposure from an oleophilic state to a hydrophilic state.

3. A method according to claim 1 wherein the image-recording layer or surface is switched by the exposure from a hydrophilic state to an oleophilic state.

4. A method according to claim 1 wherein the imaging material is a reversible switchable material of which the lithographic image is erased after the printing step.

5. A method according to claim 1 wherein the imaging material comprises an infrared light absorbing compound and is exposed to infrared light.

6. A method according to claim 1 wherein the imaging material is exposed to ultraviolet light.

7. A method according to claim 1 wherein the image material is not sensitive to daylight.

8. A method according to claim 1 wherein the exposure step is carried out while the imaging material is mounted in a printing press.

9. A method according to claim 1 wherein the switching of the affinity of the image-recording layer or surface towards ink or an ink-abhesive fluid is due to heat-induced polymer particle coagulation, or heat- or light-induced bond-breaking leading to elimination of a functional group, or heat-induced disrupture of a microcapsule.

10. A method according to claim 1 wherein the single-fluid ink is an emulsion comprising a continuous ink phase comprising an acid-functional vinyl resin and a discontinuous polar phase comprising a liquid polyol.

* * * * *